US011235264B2

United States Patent
Hrin et al.

(10) Patent No.: US 11,235,264 B2
(45) Date of Patent: Feb. 1, 2022

(54) FILTER APPARATUS

(71) Applicant: HYDAC PROCESS TECHNOLOGY GMBH, Neunkirchen (DE)

(72) Inventors: Sebastian Hrin, Elsdorf (DE); Hans-Jürgen Lingen, Mönchengladbach (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 0 days.

(21) Appl. No.: 16/758,239

(22) PCT Filed: Oct. 23, 2018

(86) PCT No.: PCT/EP2018/078966
§ 371 (c)(1),
(2) Date: Apr. 22, 2020

(87) PCT Pub. No.: WO2019/081466
PCT Pub. Date: May 2, 2019

(65) Prior Publication Data
US 2020/0246731 A1    Aug. 6, 2020

(30) Foreign Application Priority Data
Oct. 26, 2017   (DE) ................. 10 2017 009 990.1

(51) Int. Cl.
*B01D 29/52*   (2006.01)
*B01D 29/66*   (2006.01)
(Continued)

(52) U.S. Cl.
CPC .......... *B01D 29/52* (2013.01); *B01D 29/668* (2013.01); *B01D 29/114* (2013.01); *B01D 29/15* (2013.01);
(Continued)

(58) Field of Classification Search
CPC .... B01D 29/52; B01D 29/668; B01D 29/114; B01D 29/15; B01D 35/12;
(Continued)

(56) References Cited

U.S. PATENT DOCUMENTS

| 3,380,591 | A | * | 4/1968 | Muller | ................. | B01D 29/846 |
| | | | | | | 210/143 |
| 2014/0091021 | A1 | * | 4/2014 | Wnuk | .................... | B01D 29/52 |
| | | | | | | 210/108 |
| 2014/0202938 | A1 | | 7/2014 | Wnuk et al. | | |

FOREIGN PATENT DOCUMENTS

| CN | 201880423 | 6/2011 |
| DE | 1 486 812 | 3/1970 |

(Continued)

OTHER PUBLICATIONS

International Search Report (ISR) dated Jan. 29, 2019 in International (PCT) Application No. PCT/EP2018/078966.

*Primary Examiner* — Waqaas Ali
(74) *Attorney, Agent, or Firm* — Wenderoth, Lind & Ponack, L.L.P.

(57) ABSTRACT

A filter device for cleaning particulate contaminants from a fluid flow, includes a plurality of filter elements (34, 60) accommodated in filter chambers (12, 14, 32) as components of a joint filter housing (10) and grouped around a backwash device (20) having a piston accumulator (56) for receiving a backwash fluid. In the storage housing (64) of the piston accumulator, a piston (57) is guided in a longitudinally movable manner, is controlled by a pressure medium, and passes on the backwash fluid stored in the storage housing (64) on to at least one filter element (60) to be backwashed for cleaning purposes via a backwash device (20). The backwash device also discharges the backwash fluid from the filter device. A specific filter element as a bypass filter element (34) is selected from the plurality of filter elements (Continued)

(34, 60), and exclusively removes particles after a change-over device (18) has been actuated, while the other filter elements (60) are excluded from this removal process.

10 Claims, 5 Drawing Sheets

(51) Int. Cl.
  *B01D 29/11* (2006.01)
  *B01D 29/15* (2006.01)
  *B01D 35/12* (2006.01)
(52) U.S. Cl.
  CPC ...... *B01D 35/12* (2013.01); *B01D 2201/0446* (2013.01); *B01D 2201/287* (2013.01)
(58) Field of Classification Search
  CPC ...... B01D 2201/0446; B01D 2201/287; B01D 35/147; B01D 29/665
  See application file for complete search history.

(56) References Cited

FOREIGN PATENT DOCUMENTS

| | | |
|---|---|---|
| DE | 1 817 738 | 2/1972 |
| DE | 10 2007 054 737 | 5/2009 |
| DE | 10 2011 100 518 | 11/2012 |
| DE | 10 2015 102 318 | 8/2016 |
| WO | 2012/150011 | 11/2012 |
| WO | 2017/088949 | 6/2017 |

\* cited by examiner

FILTER APPARATUS

FIELD OF THE INVENTION

The invention relates to a filter device for cleaning particulate contaminants from a fluid flow. A plurality of filter elements are accommodated in filter chambers as components of a joint filter housing and are grouped around a backwash device having a piston accumulator for receiving a backwash fluid. In the storage housing of the piston accumulator, a piston is guided in a longitudinally movable manner, is controlled by a pressure medium and passes the backwash fluid stored in the storage housing on to at least one filter element to be backwashed for cleaning purposes via a backwash device. The backwash device also discharges the backwash fluid from the filter device.

BACKGROUND OF THE INVENTION

Such a filter device is known from WO 2012/150011 A1, for instance. The known filter device comprises a pressure control device to support the backwashing of individual filter elements having a hydraulic accumulator. One fluid chamber of the hydraulic accumulator can be filled with a quantity of cleaned fluid during the filtration process and can for a backwashing process be connected to the clean side of the filter element to be cleaned via a backwash duct. A further fluid chamber of the hydraulic accumulator can be pressurized by a gas pressure for a backwash process to at least partially discharge the filling quantity of the cleaned fluid for the backwash process of a filter element from the one fluid chamber by a movement of the separating element of the hydraulic accumulator caused by the gas pressure.

Such filter devices are also regularly used in marine applications, in particular in marine engines. The International Maritime Organization (IMO) has tightened the limit values for climate-relevant exhaust gases from ships, such as nitrogen oxides and sulfur oxides, as part of the Tier III standard, which has come into force in 2016. The manufacturers of modern marine engines are therefore increasingly relying on common-rail systems to reduce fuel consumption and exhaust gases. This reliance results in new requirements for the efficient fluid management of marine engines and the resulting increased demands on the purity of fuels and lubricants on board of ships.

Such filter devices are regularly provided with bypass filters, through which the fluid flow to be cleaned, regularly being heavy fuel oil, diesel, biofuels and lubricating oil, is routed exclusively for cleaning purposes, as soon as the bypass filter, controlled by a changeover device, permits the actual filter device to be shut down for maintenance and inspection purposes, including replacing used filter elements with new elements in this context.

Experience has shown that the solutions described above are large and, from a design engineering point of view, on-site installation is often complex and therefore costly. In addition, the different installation locations of filter devices and assigned bypass filters, even if they are arranged adjacent to each other, result in different thermal operating situations. Those situations can have unfavorable effects on fluid treatment, particularly in relation to fluid filtration.

Furthermore, a principal objective is to be able to use the proven filtration technology in the context of fuel supply for marine engines and their lubrication for other new areas of application, for instance in the context of filtering cooling lubricants in machine tools, etc.

SUMMARY OF THE INVENTION

Based on this state of the art, the invention addresses the problem of further improving the known filter devices, while maintaining the advantages of the known filter devices, i.e., to ensure a safe filtration of particle contamination from fluids, such that new fields of application for this filtration technology can be developed and such that installation space when setting up can be reduced and costs can be reduced, with improved thermal conditions during the operation of such devices. A filter device according to the invention solves this problem.

Because by selecting a specific filter element as a bypass filter element from the plurality of filter elements of the device, this specific filter element exclusively removes particles after a changeover device has been actuated and the other filter elements are excluded from this removal process. The bypass filter element or the bypass filter itself is an integral part of the overall filter housing in conjunction with the other filter elements of the device. The filter elements each have an independent filter chamber, which form the filter housing as a whole. In the practical implementation of the invention by integrating the bypass filter element into the overall system of filter elements in only one housing device, in particular if the filter housing is made of cast steel, a uniform thermal heat distribution within the filter device having the bypass device is achieved. The previously existing danger of thermally induced stress cracks in the housing has been effectively eliminated, there is a homogenized thermal entry of the hot or at least warm (at operating temperature) fluid into the housing including its individual components, such as the filter element and the backwash device, during operation of the device, resulting in a positive effect on fluid filtration.

In this respect, the filter device according to the invention also has a compact design and can therefore be installed in places offering limited installation space, as is the case for coolant filtration of machine tools. Because solely one filter housing having filter chambers for all filter elements including the bypass filter element has to be provided, preferably within the framework of a single steel casting, the filter device according to the invention is also cheap to manufacture. Because of the central arrangement of all components in and on the central housing, the installation and maintenance costs are also reduced.

In an advantageous design, the bypass filter integrated in the filter housing and its filter element can also be used for starting up fuel systems and other hydraulic systems of any kind, in which very high dirt loads of particle contamination can occur by initially excluding the further filter device with its filter elements from the filtration process. If the individual bypass filter element can no longer be used due to the ingress of dirt, it may be replaced by a new element. The replacement may be performed several times until a normal operating situation is established, in which case the system is switched to normal filtration mode in addition to backwashing using the further filter device, bypassing the bypass filter.

In another advantageous design, provision can be made to select the arrangement of the bypass filter element and the other filter elements of the filter device such that all filter elements can be cleaned in succession using only one backwash device. In this way it would be possible to use the bypass filter element as a further filter element for filtration purposes as well, like the other filter elements of the filter device in addition to its bypass filtration function.

In a preferred embodiment of the filter device according to the invention, the changeover device is also accommodated in the joint filter housing and has a distribution device which, in its one switch position bypassing the bypass filter element, supplies the other filter elements, insofar as they are not subject to backwashing, with unfiltered medium and discharges the filtrate and which, in a further switch position bypassing these filter elements, supplies the bypass filter element with unfiltered medium and discharges the filtrate. The distribution device provides the proper branching and allocation of the fluid paths in the filter device. In start-up mode, the fluid flow containing coarse contamination is routed to the bypass filter element as unfiltered medium and is cleaned there using a suitable filter material having preferably a lower grade of filtration. The other filter elements are then excluded from the filtration mode.

During regular mode of the filter device, the uncleaned or contaminated fluid flow is routed to the other filter elements as unfiltered medium flow and cleaned using a suitable, predeterminable filter material. The bypass filter element then is excluded from the filtration mode. However, in principle it would also be possible to integrate the bypass filter element into the regular filtration mode after completing start-up mode and the assigned cleaning by the backwash device. Due to the compact arrangement of the components of the filter device according to the invention in a joint filter housing, preferably made of cast steel, the filter elements used in regular mode are uniformly subjected to fluid, even at accordingly high operating temperatures, e.g. $130°$ C., preventing harmful thermal stresses in the filter housing.

Preferably, the changeover device is arranged adjacent to the bypass filter element and can be operated manually or mechanically by an operator. It is also advantageous to form the changeover device as a changeover fitting that can be moved manually between the switch positions by a hand lever. The hand lever, which is particularly preferably designed as a single-arm lever, is located at a point of the filter housing easily accessible for an operator, preferably on the top. In addition to ease of use and a simple design, the hand lever offers the advantage that the individual switch position of the changeover valve is indicated by the position of the hand lever and can be checked by an operator without additional effort. To increase operational safety and for remote maintenance purposes, at least one sensor for monitoring the switch position of the changeover device can be provided on the filter device in accordance with the invention.

In a further preferred embodiment of the invention, at least one filter element from the plurality of filter elements, including the bypass filter element, can be backwashed by the backwash device. The filter elements arranged in individual filter chambers are typically backwashed in succession and in continuous sequence and freed from dirt particles adhering to the relevant filter material in the return flow. By the continuous and demand-oriented backwashing of the individual filter elements, the high purity requirements of fuels and lubricants is taken into account. By the attendant dirt discharge, a high performance of the filter device is ensured.

To backwash a filter element, the backwash device, which is preferably rotatable around the symmetry axis of the filter housing, is rotated towards the filter element to be backwashed. The backwash fluid pressurized by the pressure medium is fed to the filter element to be cleaned through a backwash channel and discharged from the filter device via a further backwash channel and a backwash line connected thereto. The backwash channels are part of the backwash device and are preferably arranged rotatably in the filter housing via a joint drive. Depending on the arrangement and flow direction of the filter elements during filtration mode, from the inside to the outside or from the outside to the inside, the position of the individual backwash channel is selected in relation to the filter element, above, below or lateral thereof. A particularly compact design of the filter device according to the invention is achieved by a cylindrical backwash device that is rotatably arranged in a main part of the filter housing and whose backwash channels are arranged in the individual backwash positions at fluid supply ducts and fluid discharge ducts to and from the filter chambers branching off laterally from the main part.

In a further preferred embodiment of the filter device according to the invention, the changeover device has a spindle, which can be rotated in a spindle housing as part of the filter housing and which has two fluid channels separated from each other on the outer circumference and connected to a fluid inlet of the filter housing for the supply of unfiltered medium and to a fluid outlet for discharging filtrate. In one switch position of the changeover device, the two fluid channels are connected to the filter elements provided for filtration and to the bypass filter element in the other switch position. The fluid channels, which preferably extend horizontally and vertically on the outside of the spindle, ensure besides short fluid paths a good heat transfer from the fluid flow guided in the fluid channels to the wall parts of the filter housing encompassing the spindle. The specifications "horizontal" and "vertical" refer to the usual installation or mounting position of the filter device according to the invention, whose filter elements and filter chambers generally run in the vertical installation direction.

The spindle being rotatably arranged in a part of the filter housing results in a compact, space-saving structure of the changeover device. Typically, the spindle housing has an installation size comparable to that of a filter chamber. Advantageously, the fluid inlet and the fluid outlet are arranged on an outer wall part of the filter housing encompassing the spindle housing. The fluid inlet and fluid outlet are preferably arranged vertically one above the other to save installation space.

In a further preferred embodiment of the filter device according to the invention, two fluid ducts separated from each other are provided on an inner wall of the filter housing, relative to the position of the piston accumulator, within the filter housing. These fluid ducts at least partially encompass the piston accumulator and, in one switch position of the changeover device, are connected in a fluid-conveying manner to the assignable fluid channels in such a way that filtration is made possible using the filter element provided for this purpose in each case. The filter element is flowed through from the outside to the inside for removing particles. A defined fluid routing of the fluid to be cleaned is ensured in a functionally reliable manner according to the individual switch position of the changeover device by the fluid channels and fluid ducts formed in the filter housing.

In a further preferred embodiment of the filter device according to the invention, the backwash device cleans the particle contamination in counterflow to the direction of filtration from the filter element provided for this purpose. Two backwashing channels are arranged opposite from each other and are guided in the filter housing in a fluid-conveying manner with the two opposite ends of the filter element to be backwashed, thereby shutting off the two fluid ducts for the filtration process. Of the two backwash channels, one supplies the pressurized backwash fluid preferably from above, and the other discharges the contaminated backwash fluid preferably from below. The two backwash channels are rotatable via preferably a joint drive and can be positioned as required at the fluid discharge duct and the fluid supply duct of the filter element to be cleaned. The duration and the frequency of a backwashing process at the individual filter element can be selected according to individual requirements or automatically adjusted according to a predetermined cleaning cycle. If a certain degree of contamination of the filter materials of the filter elements is detected, for instance if a pre-settable differential pressure is exceeded, the backwashing process can be started, and the filter elements can be cleaned in succession by the backwash device.

A particularly compact and stable structure of the filter device according to the invention is achieved by closing the lower bottom ends of the respective filter elements and having a fluid discharge duct at their upper end. The upper end is closed off from the assignable filter chamber, which encloses the individual filter element at a radial distance. When the filter elements closed at one end are arranged in the individual filter chamber, the fluid path for cleaning the fluid flow is defined in that the unfiltered medium flows into the individual filter chamber from a radial side via the fluid ducts formed in the filter housing and flows from the outside to the inside through the filter element arranged therein. When flowing through the filter element from the outside to the inside, the particulate contaminants remain on the outside of the filter material of the relevant filter element, and the filtrate is returned to the fluid discharge duct via the fluid discharge at the upper end of the filter element.

In another preferred embodiment of the invention, the piston accumulator has a filtrate space above its piston for receiving filtrate from the filter device and has a control space below the piston for receiving compressed gas. The compressed gas moves the piston upwards thereby displacing the filtrate in the filtrate space, which cleans the filter element from particle contamination from the inside to the outside via the upper backwash channel and the fluid discharge duct in the filter element. At least a part of the fluid cleaned off at the individual filter elements can be accommodated in the filtrate space and is used as a washing liquid for cleaning a filter element to be cleaned, while pressurizing the piston using compressed gas as a pressure medium. Preferably, the entire volume of the filtrate taken up in the filtrate space is used as a backwash fluid during a backwash process and is fed into the filter cavity of the filter element via the corresponding backwash channel. The corresponding filter element is cleaned from the inside to the outside, opposite to the direction of filtration. The pressure surge when moving the piston in the piston accumulator results in a pulse-like cleaning of the filter material.

A further advantage is that the lower backwash channel of the backwash device, connected to the filter chamber of the filter element to be backwashed, is used to remove the particle contamination from the filter device. This arrangement makes for a compact, reliable design of the backwashing laterally parallel to the regular filtration mode.

The above-mentioned features and the further cited features according to the invention can be implemented individually or in any combination in a filter device according to the invention and for the designated use.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
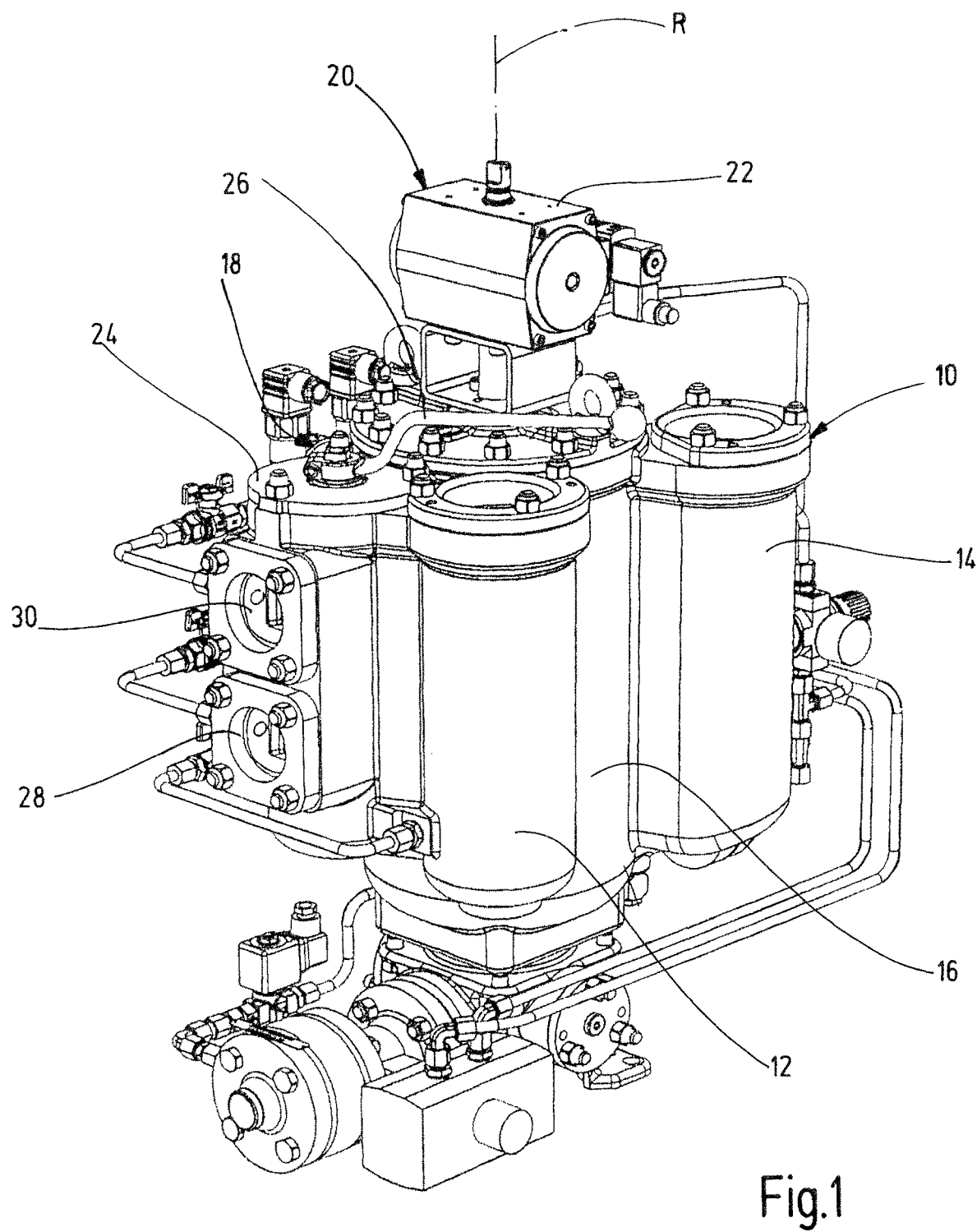
FIG. 1 is a perspective view of a filter device according to an exemplary embodiment of the invention.

FIG. 1 shows an overall view of the filter device according to an exemplary embodiment of the invention having a filter housing 10, which has three filter chambers, a first filter chamber 12, a second filter chamber 14 and a third filter chamber 32 (see FIG. 2), a spindle housing 24, a main housing part 16 and a drive unit 22. A fluid inlet 28 is provided on the spindle housing 24 for the supply of fluids to be cleaned. An outlet 30 is provided for discharging cleaned fluids. A filter element 34 (see FIG. 3), 60 (see FIG. 4) is inserted in each filter chamber 12, 14, 32. A central component of the filter device is a changeover device or switch 18, which is enclosed by the spindle housing 24 and of which only an actuating device in form of a hand lever 26 is visible in FIG. 1. Further, a backwash device or backwasher 20 is provided on the filter device, which backwash device is accommodated in the main housing part 16 and of which the drive unit 22 arranged above the main housing part 16 is visible in FIG. 1.

Figure 2:
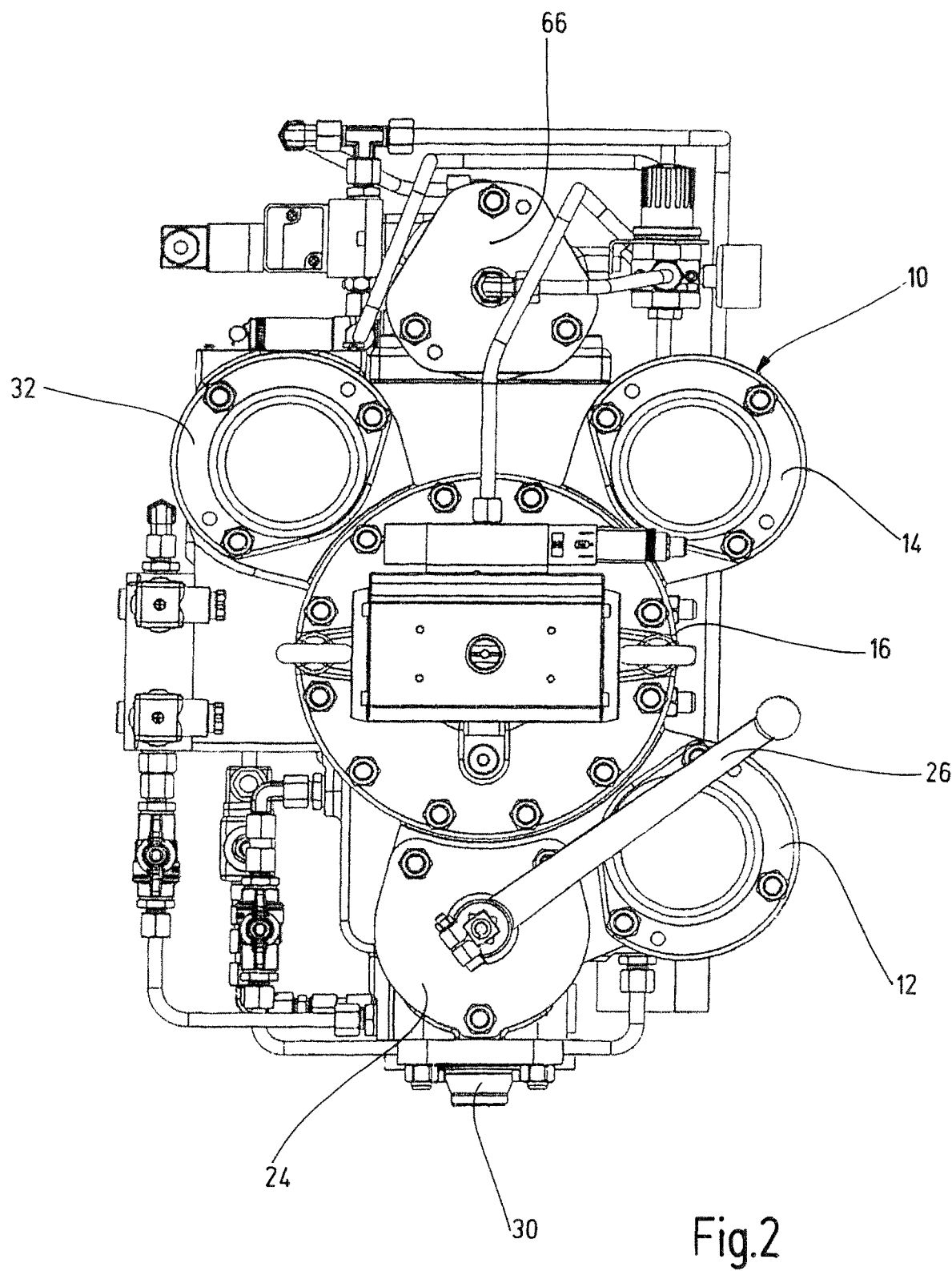
FIG. 2 is a top plan view of the filter device of FIG. 1.
Figure 3:
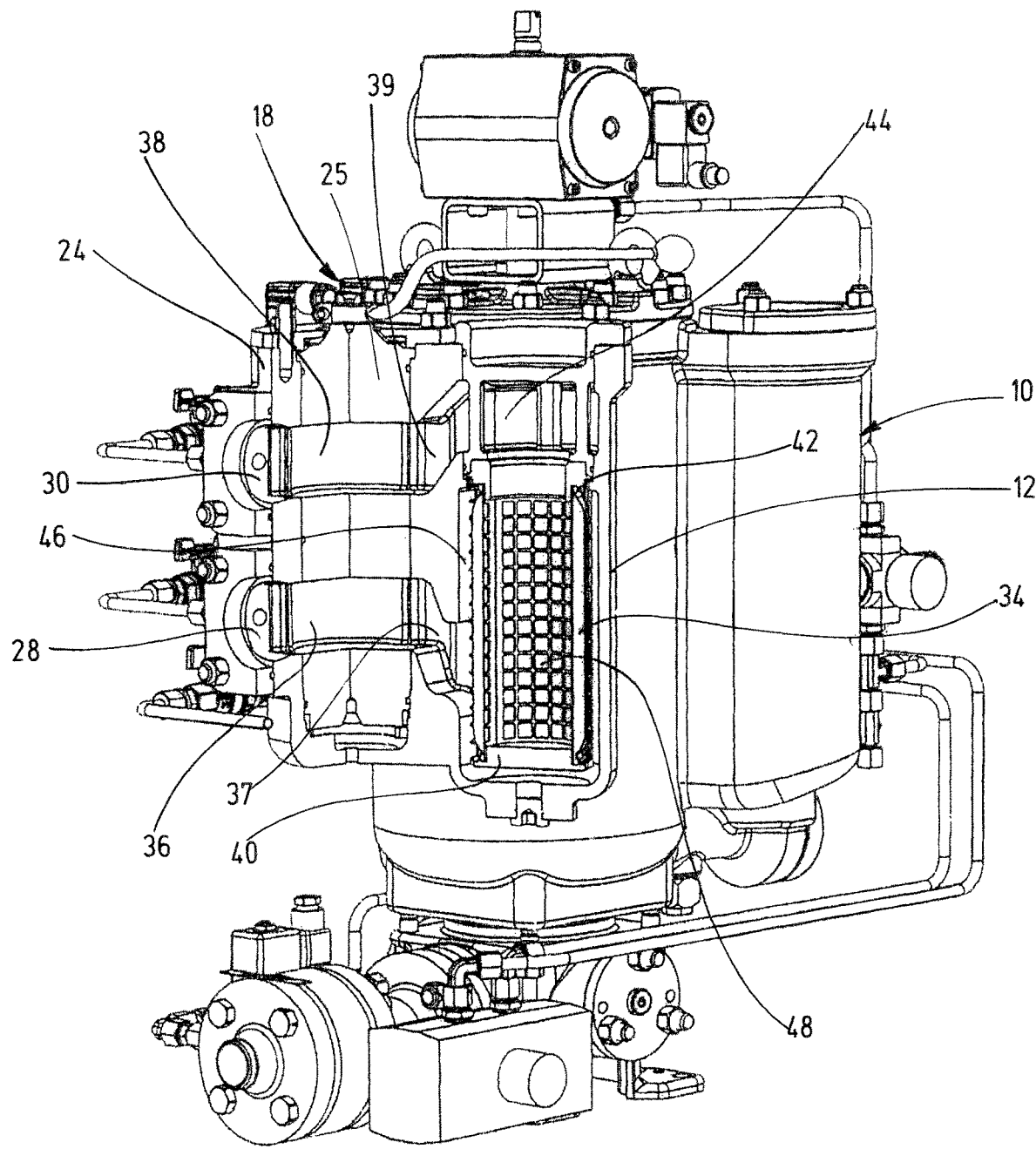
FIG. 3 is a perspective view partially in section of the filter device of FIG. 1 illustrating the bypass mode.
Figure 4:
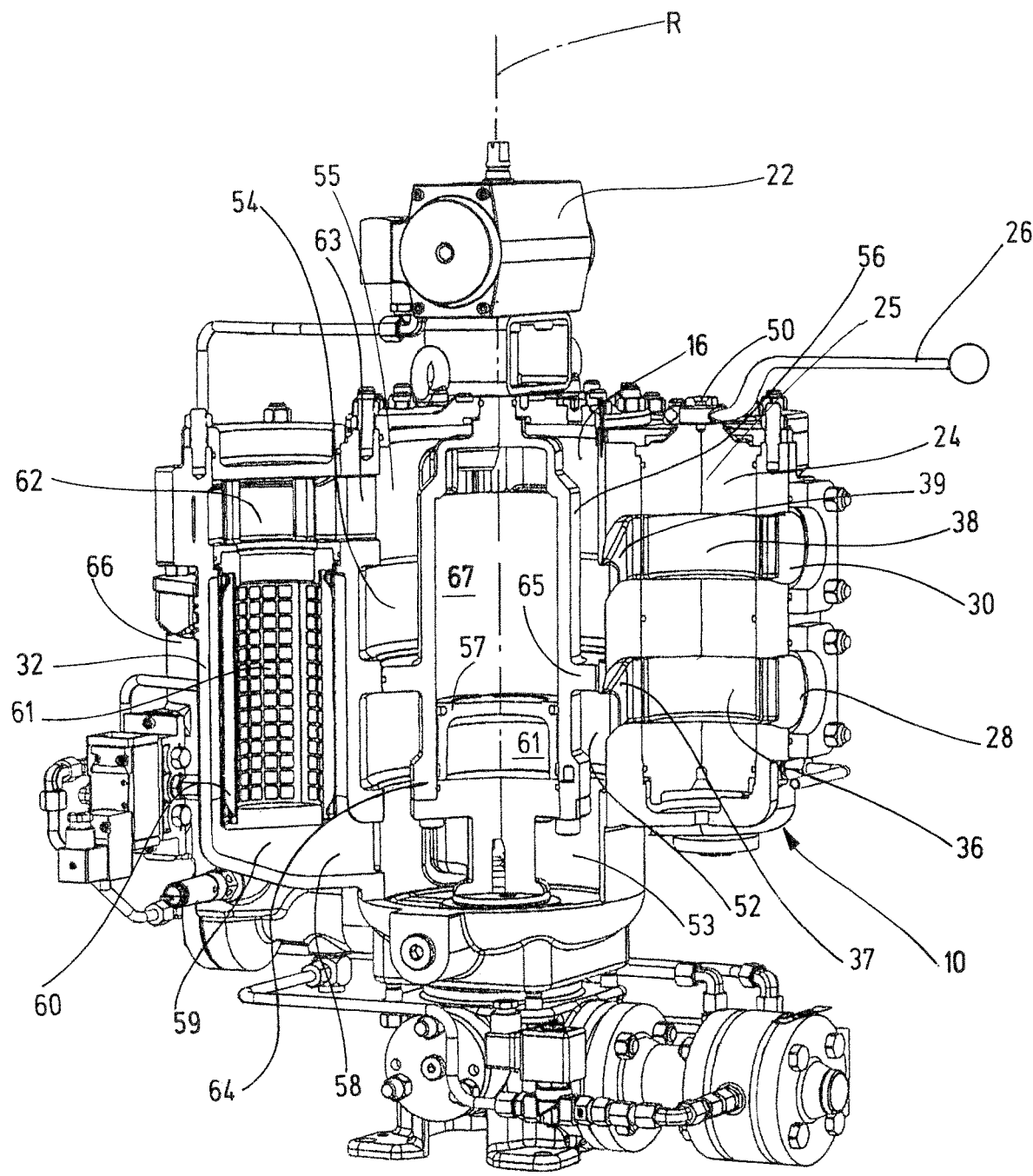
FIG. 4 is a perspective view partially in section of the filter device of FIG. 1 illustrating the filtration mode.
Figure 5:
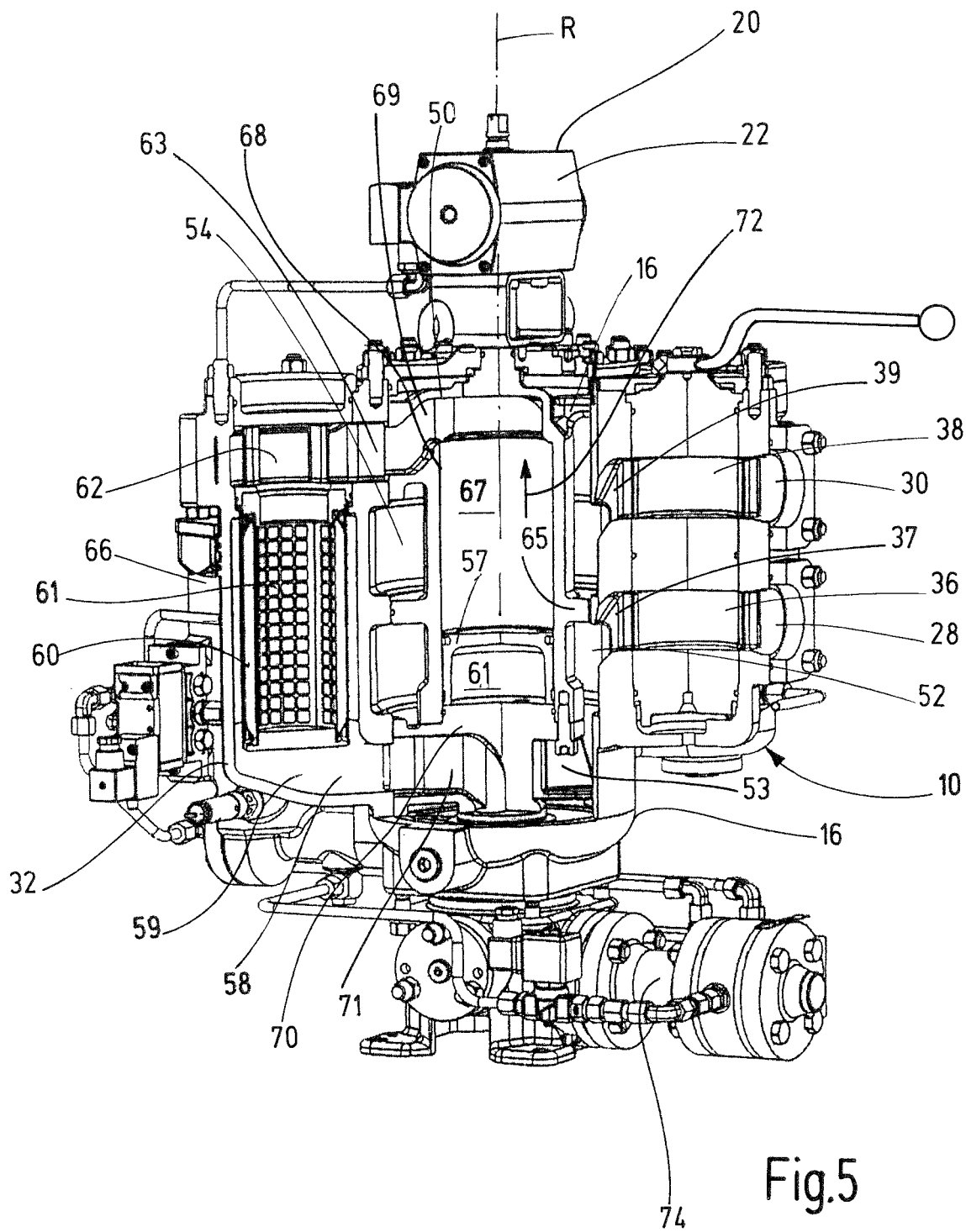
FIG. 5 is a perspective view partially in section of the filter device of FIG. 1 illustrating the backwash mode.

In the at least partly sectional illustrations of FIGS. 3, 4 and 5, the bypass mode is illustrated in FIG. 3, the filtration mode is illustrated in FIG. 4, and the backwash mode is illustrated in FIG. 5. The top view of the filter device of FIG. 2 shows the filter chambers 12, 14, 32 and the spindle housing 24 arranged on a circular line such that they concentrically encompass a hydraulic accumulator located therebetween in the main housing part 16. As FIGS. 4 and 5 show, a piston accumulator 56 forms the hydraulic accumulator.

FIG. 3 illustrates bypass mode, in which fluid flowing into the filter housing 10 at the fluid inlet 28 is purified at the bypass filter element 34 in the first filter chamber 12 and routed to the fluid outlet 30 as filtrate. The changeover device 18 formed as a changeover fitting can be shifted manually between the switch positions by the hand lever 26 and has a spindle 25 rotatably arranged in the spindle housing 24. In the switch position of the changeover device 18 shown in FIG. 3, the fluid channels 36, 38 formed on the spindle 25 are connected to the first filter chamber 12 in a fluid-conveying manner. In the first filter chamber 12, the cylindrical bypass filter element 34 is arranged in a holder 42 and has a closed bottom 40.

The unfiltered medium passes from the fluid inlet 28 to an inlet space 46 of the first filter chamber 12 via the first fluid channel 36 extending horizontally and formed in the spindle 25 and a first connecting piece 37 formed in the spindle housing 24. The inlet space 46 radially encompasses the bypass filter element 34. In the exemplary embodiment shown, the bottom 40 of the bypass filter element 34 is spaced apart from the bottom of the first filter chamber 12, so that the part of the interior space of the first filter chamber 12 located below the bottom 40 also has to be assigned to the inlet space 46. The unfiltered medium flows from the inlet space 46 through the bypass filter element 34, is cleaned there and reaches a filter cavity 48. From the filter cavity 48 the filtrate reaches a fluid discharge duct 44 located above the holder 42 and further on the fluid outlet 30 via a second connector 39 formed in the spindle housing 24 and via the second fluid channel 38 formed in the spindle 25.

The first and second connecting pieces 37, 39 each have a channel width comparable to the fluid channels 36, 38 and differ in their fluid paths in that the first connecting piece 37 starting from the first fluid channel 36 drops at a step-shaped gradient towards the inlet space 46, and in that the second connecting piece 39 starting from the fluid discharge duct 44 drops at a step-shaped gradient towards the second fluid channel 38. The fluid routing shown in FIG. 3 is possible because the spindle housing 24 is arranged immediately adjacent to the first filter chamber 12 and is preferably formed integral therewith. This side-by-side arrangement is clearly visible in the plan view of FIG. 2. FIG. 2 further shows that the second and third filter chambers 14, 32 and the spindle housing 24 are arranged equidistantly from each other on the main housing part 16 in relation to the axis of symmetry R (see FIG. 1) of the main housing part 16. The axis of symmetry R of the main housing part 16 is also the axis of rotation of an output shaft of the drive unit 22, for instance in the form of an electric motor.

The bypass filter element 34 and the filter element 60 arranged in the third filter chamber 32 (cf. FIG. 5) are each of hollow cylindrical in shape. A conically tapering shape is also feasible as an alternative to the cylindrical shape. The filter elements 34, 36 can be formed as filter cartridges. A metal fiber fleece, a dutch weave or a square mesh fabric is preferably used as the filter material. The filter element 60 used to remove the particulate contamination occurring during a regular mode preferably has a filter material having a higher grade of filtration than that of the bypass filter element 34.

In filtration mode of the filter device shown in FIG. 4, the switch position of the changeover device 18 is selected such that, bypassing the bypass filter element 34, the other filter elements 60, provided they are not subject to backwashing, are supplied with unfiltered medium and the filtrate is discharged. In doing so, the hand lever 26, which is firmly connected to the spindle 25, is swiveled clockwise by approx. 120° in plan view in relation to the bypass position shown in FIG. 2.

In the functional position of the filter device shown in FIG. 4, unfiltered medium flowing into the filter housing 10 at the fluid inlet 28 reaches a chamber 53 in the bottom of the main housing part 16 via the first fluid channel 36 and the first connecting piece 37 and a further inlet space 59 of the third filter chamber 32 via a first further connecting piece 58. A filter element 60 is arranged in the third filter chamber 32 comparable to the arrangement of the bypass filter element 34 in the first filter chamber 12 (see FIG. 3). The fluid flows in the radial direction from the further inlet space 49 through the filter element 60 and reaches a further fluid discharge duct 62 via a further filter cavity 61. The filtrate flows from the further fluid discharge duct 62 to a chamber 55 on the cover side in the main housing part 16 via a second further connecting piece 63 and to the fluid outlet 30 via the second connecting piece 39 and the second fluid channel 38.

A piston accumulator 56 is arranged coaxially to the axis of symmetry R in the main housing part 16, on the housing 64. In the piston accumulator 56, the bottom-side chamber 53 and the cover-side chamber 55 are separated from each other by a partition wall 65. On an inner wall of the filter housing 10, there are two fluid ducts 52, 54 that are separated from each other in relation to the position of the piston accumulator 56. Fluid ducts 52, 54 at least partially encompass the piston accumulator 56 and are connected to the respective assignable fluid channels 36, 38 in the switch position of the changeover device 18 shown in FIG. 4.

The filter element 60 arranged in the third filter chamber 32 is backwashed in the functional position of the filter device shown in FIG. 5. The backwash device 20 comprises two washing arms 68, 70 formed on the piston accumulator 56, which washing arms are guided to the assigned filter chambers 12, 14, 32 by an assigned rotary movement of the piston accumulator 56. The washing arms 68, 70 block the two fluid ducts 52, 54 for a filtration process in the third filter chamber 32. In this way, fluid can be filtered using one filter element and the other filter element can be simultaneously backwashed. The interior space of the piston accumulator 56 is subdivided by a piston 57, which can be moved longitudinally in the storage housing 64, into a filtrate space 67 for receiving filtrate from the filter device and a control space 56 for receiving compressed gas. Filtrate flows from the chamber 55 on the cover end into the filtrate space 67 of the piston accumulator 56 via a filling bore 50, which is formed in the wall of the upper washing arm 68 and which is preferably stepped in diameter to form a narrow inlet opening, and fills this filtrate space 67, while the piston 57 of the piston accumulator 56 moves downwards into the position shown in FIG. 5.

The gas is stored in a gas tank 66, which is located adjacent to the second and third filter chambers 14, 32 on the filter housing 10, see FIG. 2. For backwashing, the piston 57 is driven upwards by feeding compressed gas into the control space 61, as illustrated by the arrow 72, to create a flow in the manner of a pressure surge from the filtrate located in the filtrate space 67. The pressure surge reaches the further filter cavity 61 via an upper backwash channel 69, which is predetermined by the upper washing arm 68, the second further connecting piece 63 and the further fluid discharge duct 62. When flowing through the filter element 60 from the inside to the outside, the particulate contamination adhering to the filter material is removed and the backwash fluid including the contaminants is discharged via the further inlet space 59 and a lower backwash channel 71 specified by the lower washing arm 70 into a valve-controlled backwash line 74, and in that way out of the filter device.

While one embodiment has been chosen to illustrate the invention, it will be understood by those skilled in the art that various changes and modifications can be made therein without departing from the scope of the invention as defined in the claims.

The invention claimed is:

1. A filter device for cleaning particulate contaminants from a fluid flow, the filter device comprising:
   a common filter housing having first, second and third filter chambers with first, second and third filter elements in the first, second and third filter chambers, respectively, having an inlet for receiving unfiltrate and having an outlet for discharging filtrate;
   a backwasher having the first, second and third filter chambers grouped about the backwasher, the backwasher including a piston accumulator housing and a piston guided for longitudinal movement in the accumulator housing and activated by a pressure medium, a quantity of backwash fluid being receivable in the accumulator housing, being selectively conveyable to at least one of the second and third filter elements to be cleaned by the backwash fluid and being removable from one of the second and third filter elements being backwashed with particle contaminants removed by the backwash fluid;

a bypass filter element formed by the first filter element; and a switch selectively and exclusively connecting the bypass filter element to carry out the particle cleaning of a fluid flow into the common filter housing while the second and third filter elements are excluded from cleaning the filter flow, the switch being accommodated in the common filter housing, in a first position of the switch the bypass filter element being blocked from fluid communication with the inlet and the outlet while the second and third filter elements being in fluid communication with the inlet and the outlet, in a second position of the switch the bypass filter element being in fluid communication with the inlet and the outlet while the second and third filter elements being blocked from fluid communication with the inlet and the outlet.

2. A filter device for cleaning particulate contaminants from a fluid flow, the filter device comprising:

a common filter housing having first, second and third filter chambers with first, second and third filter elements in the first, second and third filter chambers, respectively;

a backwasher having the first, second and third filter chambers grouped about the backwasher, the backwasher including a piston accumulator housing and a piston guided for longitudinal movement in the accumulator housing and activated by a pressure medium, a quantity of backwash fluid being receivable in the accumulator housing, being selectively conveyable to at least one of the second and third filter elements to be cleaned by the backwash fluid and being removable from one of the second and third filter elements being backwashed with particle contaminants removed by the backwash fluid;

a bypass filter element formed by the first filter element; and a switch selectively and exclusively connecting the bypass filter element to carry out the particle cleaning of a fluid flow into the common filter housing while the second and third filter elements are excluded from cleaning the filter flow, the switch being accommodated in the common filter housing and including a distributor having a first switching positon bypassing the bypass filter element and supplying the second and third filter elements not being backwashed with unfiltered medium and discharging the filtrate from the second and third filter element not being backwashed, and having a second switching position supplying only the bypass filter element with the unfiltered medium and discharging filtrate from the bypass filter element.

3. A filter device according to claim 2 wherein the switch comprises a switchover valve manually operable between the first and second switching positons by a manual lever.

4. A filter device according to claim 1 wherein each of the first, second and third filter elements can be individually backwashed by the backwasher.

5. A filter device according to claim 1 wherein the switch comprises a spindle rotatable in a spindle housing that is part of the common filter housing, the spindle including first and second fluid channels being separated from each other on an outer circumference of the spindle and being connected to a filter inlet in the common filter housing supplying unfiltered medium and to a fluid outlet in the common filter housing discharging filtrate, respectively, the first and second fluid channels being connected in fluid communication only to at least one of the second and third filter elements in a first switching position and only to the bypass filter element in a second switching position.

6. A filter device according to claim 5 wherein an inner wall of the common filter housing has first and second fluid ducts being separated from each other relative to a position of the piston accumulator, partially surrounding the piston accumulator, and being connected to the first and second fluid channels, respectively, in the first switching position for filtering through the second and third filter elements from an outside thereof to an inside thereof.

7. A filter device according to claim 5 wherein the backwasher cleans particle contaminants selectively from the second and third filter elements by providing a counterflow to a filtration direction via first and second backwashing channels being arranged opposite to each other, being routed movably in the switch and being selectively in fluid communication with opposing ends of the second and third filter elements being backwashed, while the first and second fluid ducts are shut off.

8. A filter device for cleaning particulate contaminants from a fluid flow, the filter device comprising:

a common filter housing having first, second and third filter chambers with first, second and third filter elements in the first, second and third filter chambers, respectively, the first, second and third filter elements being closed at bottom axial ends and having fluid discharge openings at upper axial ends closed off relative to the first, second and third filter chambers and surrounding the first, second and third filter elements, respectively, with a radial gap therebetween;

a backwasher having the first, second and third filter chambers grouped about the backwasher, the backwasher including a piston accumulator housing and a piston guided for longitudinal movement in the accumulator housing and activated by a pressure medium, a quantity of backwash fluid being receivable in the accumulator housing, being selectively conveyable to at least one of the second and third filter elements to be cleaned by the backwash fluid and being removable from one of the second and third filter elements being backwashed with particle contaminants removed by the backwash fluid;

a bypass filter element formed by the first filter element; and a switch selectively and exclusively connecting the bypass filter element to carry out the particle cleaning of a fluid flow into the common filter housing while the second and third filter elements are excluded from cleaning the filter flow, the switch being accommodated in the common filter housing.

9. A filter device according to claim 8 wherein the piston accumulator comprises a filtrate chamber above the piston receiving filtrate from the second and third filter elements and a control chamber below the piston receiving compressed gas moving the piston in a upward direction displacing the filtrate in the filtrate chamber into the second and third filter elements when being backwashed via an upper backwash channel and the respective discharge opening cleaning the respective filter element of the particle contaminants from an inside to an outside of the respective filter element.

10. A filter device according to claim 9 wherein
the backwasher comprises a lower backwash channel being connected selectively in fluid communication to the second and third filter chambers being backwashed and removing the particle contaminants from the respective filter chamber.

* * * * *